US012091166B1

(12) United States Patent
Haas

(10) Patent No.: US 12,091,166 B1
(45) Date of Patent: Sep. 17, 2024

(54) OFFSET PROPELLER CONTROLLED ROTOR

(71) Applicant: The United States of America, as represented by the Secretary of the Navy, Arlington, VA (US)

(72) Inventor: David J. Haas, North Potomac, MD (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 18/469,199

(22) Filed: Sep. 18, 2023

Related U.S. Application Data

(60) Provisional application No. 63/509,275, filed on Jun. 20, 2023.

(51) Int. Cl.
*B64C 27/46* (2006.01)
(52) U.S. Cl.
CPC ................................. *B64C 27/463* (2013.01)
(58) Field of Classification Search
None
See application file for complete search history.

(56) References Cited

U.S. PATENT DOCUMENTS

| 7,275,711 B1 | 10/2007 | Flanigan |
| 9,254,916 B2 | 2/2016 | Yang |

FOREIGN PATENT DOCUMENTS

| CN | 113120229 A | 8/2022 |
| CN | 115258143 A | 11/2022 |
| CN | 115593637 A | 1/2023 |
| CN | 218594581 U | 3/2023 |
| CN | 218617169 U | 3/2023 |

OTHER PUBLICATIONS

WO-2019129971-A1 + machine translation (Year: 2019).*
KR-102548772-B1 + machine translation (Year: 2023).*
CN-117585153-A + machine translation (Year: 2024).*
WO-2015089679-A1 + machine translation (Year: 2015).*
CN-2434226-Y + machine translation (Year: 2001).*

* cited by examiner

Primary Examiner — Juan G Flores
(74) Attorney, Agent, or Firm — Jesus J. Hernandez

(57) ABSTRACT

Example embodiments provide a propeller apparatus comprising at least one blade able to twist along a blade twist axis, a hub, a shaft connected to the hub and configured to rotate such that the at least one blade rotates about a shaft axis, and at least one offset propeller unit located in at least one of an upper surface and/or a lower surface of the at least one blade, the at least one offset propeller unit configured to provide thrust. In the propeller apparatus the thrust of the at least one offset propeller unit generates a force to cause the at least one blade to rotate about the shaft axis, and a moment about the blade twist axis of the at least one blade to cause the blade to have a blade pitch angle.

14 Claims, 9 Drawing Sheets

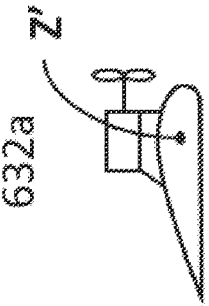
632a z'
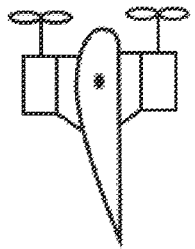
632b
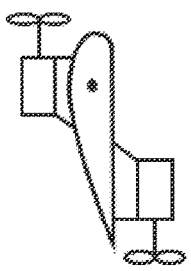
632c
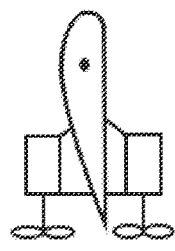
632d
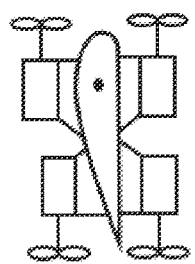
632e
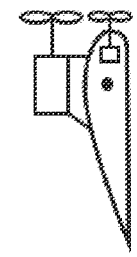
632f
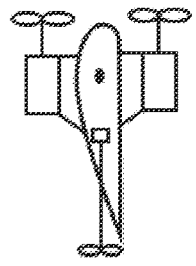
632g
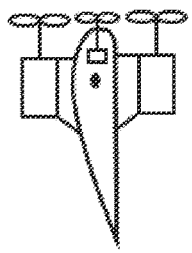
632h
FIG. 6

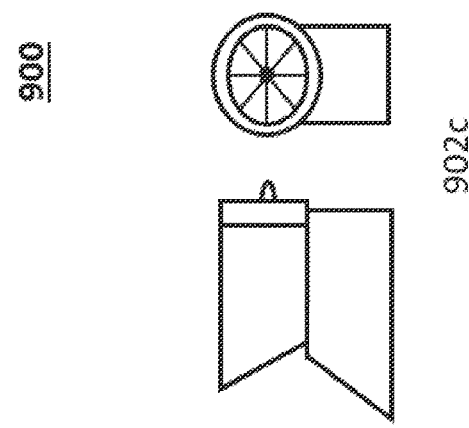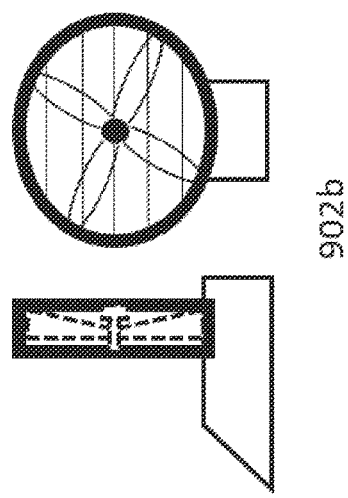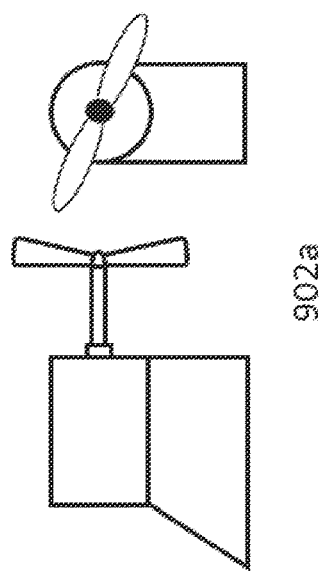
FIG. 9

OFFSET PROPELLER CONTROLLED ROTOR

CROSS-REFERENCE TO RELATED APPLICATIONS

This application claims the benefit of U.S. Provisional Application No. 63/509,275 filed Jun. 20, 2023, titled "OFFSET PROPELLER CONTROLLED ROTOR," incorporated herein by reference.

STATEMENT OF GOVERNMENT INTEREST

The following description was made in the performance of official duties by employees of the Department of the Navy, and, thus the claimed invention may be manufactured, used, licensed by or for the United States Government for governmental purposes without the payment of any royalties thereon.

FIELD

The following description relates generally to rotor systems.

BACKGROUND

Rotor systems are deployed in rotorcraft, which may include helicopters. Such rotor systems may consist of long narrow blades that rotate around a central shaft. To produce thrust to lift a rotorcraft, for example, the pitch angle of the blades is increased in a "collective" manner where all blades have the same pitch angle as they rotate about the shaft. This is known as collective pitch. To control a rotorcraft in the air, the pitch of each blade is changed in a "cyclic" manner such that the angle of pitch varies as the blade rotates about the rotor shaft. This is known as cyclic pitch. Conventional rotor systems may accomplish collective and cyclic pitch changes through a complex mechanical system made up of fixed and rotating system swashplates and pitch control rods. Such mechanical systems add significant weight and complexity to a rotorcraft.

Specific types of rotorcraft are subject to additional limitations. For example, a rotor system of a conventional single main rotor helicopter is typically driven by an engine through a transmission. Such a helicopter also typically includes a driveshaft to a tail-mounted rotor to balance the torque of the main rotor. The engine, transmission, drive system and tail rotor all add weight and complexity to the rotorcraft.

SUMMARY

Example embodiments provide a propeller apparatus comprising at least one blade able to twist along a blade twist axis, a hub, a shaft connected to the hub and configured to rotate such that the at least one blade rotates about a shaft axis, and at least one offset propeller unit located in at least one of an upper surface and/or a lower surface of the at least one blade. The at least one offset propeller unit configured to provide thrust. In the propeller apparatus the thrust of the at least one offset propeller unit generates a force to cause the at least one blade to rotate about the shaft axis, and a moment about the blade twist axis of the at least one blade to cause the blade to have a blade pitch angle.

BRIEF DESCRIPTION OF DRAWINGS

The accompanying figures are included to provide a further understanding of example embodiments, and are incorporated in and constitute part of this specification. In the figures:

FIG. 6 is a chordwise view of alternative offset configurations of an offset propeller driven rotor according to example embodiments.

FIG. 9 depicts alternative offset propeller units of an offset propeller driven rotor according to an example embodiment.

DETAILED DESCRIPTION

In the following description, for purposes of explanation and not limitation, specific details are set forth such as particular structures, designs, techniques, etc., in order to provide a thorough understanding of the example embodiments. However, it will be apparent to those skilled in the art that the disclosed subject matter may be practiced in other illustrative embodiments that depart from these specific details. In some instances, detailed descriptions of well-known elements and/or method are omitted so as not to obscure the description with unnecessary detail. All principles, aspects, and embodiments, as well as specific examples thereof, are intended to encompass both structural and functional equivalents of the disclosed subject matter. Additionally, it is intended that such equivalents include both currently known equivalents as well as equivalents developed in the future.

The following description refers to an offset propeller apparatus. However, it should be noted that the example embodiments shown and described herein are meant to be illustrative only and not limiting in any way. As such, various modifications will be apparent to those skilled in the art for application to various fields based on technologies other than the above, which may be in various stages of development and intended for future replacement of, or use with, the above described method or apparatus. These additional technologies may include ocean propellers.

Conventional rotor systems of a rotorcraft (e.g., helicopter) accomplish collective and cyclic pitch changes through complex mechanical systems. This may include fixed and rotating system swashplates, pitch control rods, engine, transmission, drive system, and tail rotor. An alternative to a conventional rotor system is to drive the rotor by thrusters located at the rotor blade tips. This configuration is known as a tip drive rotor system.

Typically, a tip drive rotor configuration utilizes small jet engines located at the blade tips to provide thrust to drive the rotor and is referred as a tip jet rotor system. Tip drive and tip jet rotor configurations have the advantage of eliminating the need for an engine and transmission to drive the main rotor. These configurations also eliminate the need for an additional tail rotor to counter the torque of the main rotor.

Technology advances in electric motors, electrical power storage and generation and precise electrical control enable the concept of electrically driven propellers to be an alternative means to drive a rotor system. Example embodiments extend this concept by employing multiple electrically powered propellers in an offset configuration to provide a means for precise rotor blade pitch control. The goal of example embodiments is to provide an efficient mechanism to achieve both collective and cyclic pitch angle changes on a rotorcraft as well as to provide an in-plane rotor driving/braking force.

Figure 1:
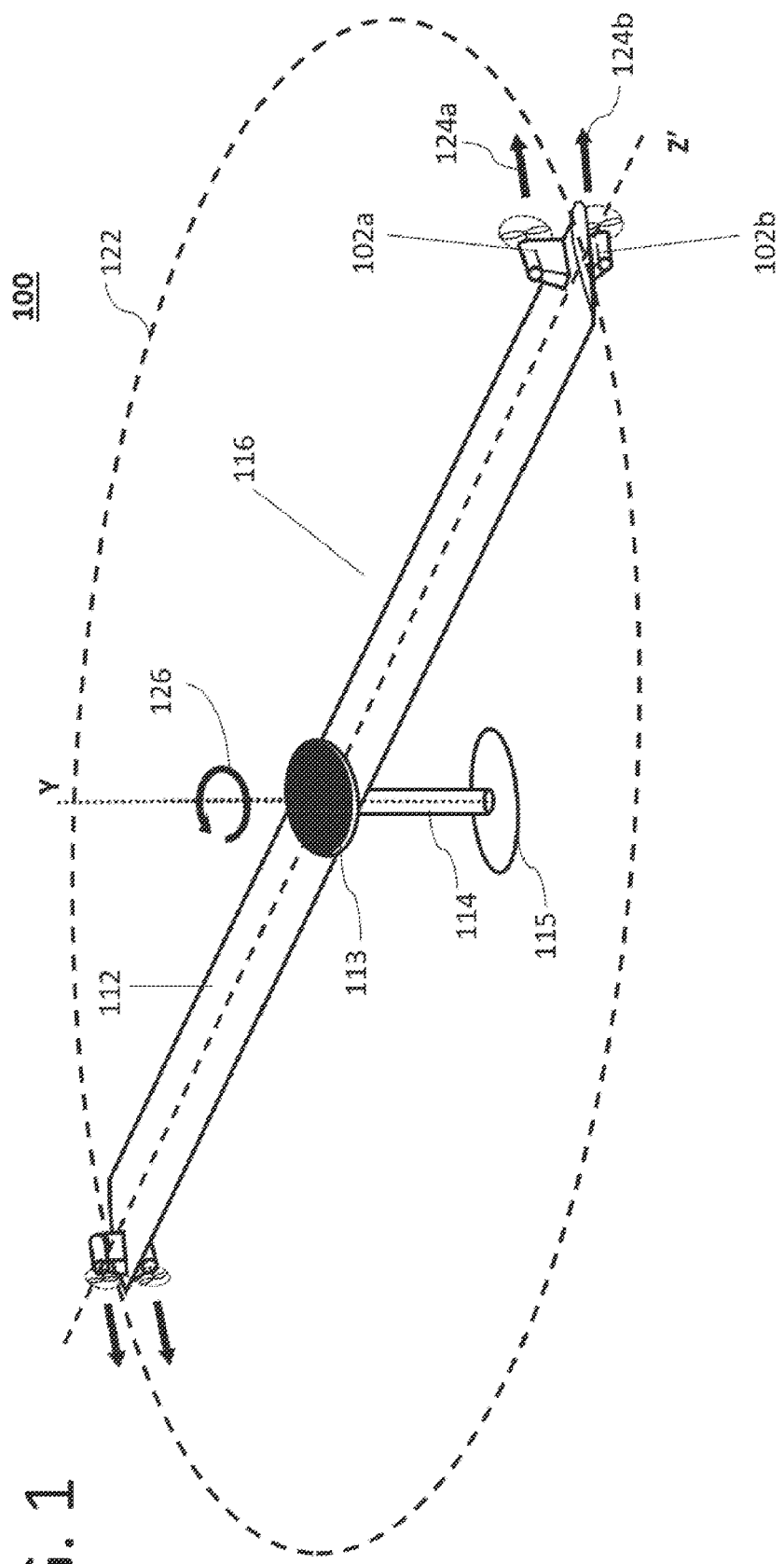
FIG. 1 is an offset propeller driven rotor according to an example embodiment.

FIG. 1 is an offset propeller driven rotor 100 according to an example embodiment. The offset propeller driven rotor 100 may be utilized to control the blade pitch of a rotor system without the need for a complex swashplate system. FIG. 1 illustrates a two-bladed rotor configuration. In alternative embodiments, the offset propeller driven rotor 100 may be in a single-bladed rotor configuration, four-bladed rotor configuration, or eight-bladed rotor configuration. Alternative embodiments may include any odd or even numbered blade rotor configurations.

FIG. 1 illustrates two blades 112 attached through a central rotor hub 113. Each blade 112 and the rotor hub 113 make up a rotor system 116. The rotor hub itself may be connected to a rotor shaft 114. The rotor shaft 114 is aligned with the Y-axis, thus serving as the rotor shaft axis. The rotor shaft 114 is connected to a base 115 that stabilizes rotation of the rotor shaft. In some example embodiments, the base 115 may be an additional motor to complement the offset propeller driven rotor 100. In some alternative example embodiments, the additional motor at the base 115 may be an electric motor and/or a conventional fuel powered engine.

The tips of each blade 112 are configured to include a pair of offset propeller units 102a, 102b. In the configuration of the offset propeller driven rotor 100, the tip of each blade includes a single offset propeller unit 102 on the upper and lower surfaces of the blade—such that there is an upper surface offset propeller unit 102a, and a lower surface offset propeller unit 102b. In alternative embodiments, the number, location, size, type, and offset of the offset propeller units may vary. This is discussed further below.

During operation of the offset propeller driven rotor 100, the blades 112 rotate around the Y-axis, which is also the rotor shaft axis. This is illustrated by blade rotation 126. In some example embodiments, rotation of the blades 112 may be realized by the offset propeller units 102a, 102b, a separate motor at the base 115, or a combination thereof. For example, the offset propeller units 102a, 102b may augment or entirely replace shaft torque produced by a separate motor connected to the rotor shaft 114 at the base 115. As such, the offset propeller units 102a, 102b may generate an in-plane rotor driving force and/or braking force.

While the offset propeller driven rotor 100 is rotating, the offset propeller units 102a, 102b at the tips of the blades 112 may move about the rotor tip path 122. The rotor tip path 122 corresponds with the diameter of the rotor system 116. At these tips, the offset propeller units 102a and 102b may generate offset propeller thrusts 124a and 124b, respectively. The difference between an upper surface offset propeller thrust 124a and a lower surface offset propeller thrust 124b may generate a net moment that causes the blade 112 to twist along the spanwise direction of the blade 112. This spanwise direction twist is illustrated by blade twist axis Z'. On the other hand, the combined forces of the upper surface offset propeller thrust 124a and the lower surface offset propeller thrust 124b may generate a net force to cause the entire rotor system 116 to rotate. The interplay between the upper surface offset propeller thrust 124a and the lower surface offset propeller thrust 124b permit an efficient mechanism to achieve both collective and cyclic pitch angle changes on a rotorcraft, as well as to provide an in-plane rotor driving/braking force. This interplay is discussed further below.

The blades 112 may be long and made of a material suitable for use in different types of rotorcraft, such as a helicopter. The blades 112 may be flexible so as to permit twisting during operation of the offset propeller units 102a, 102b. In conventional technology, the twisting of the blades is typically undertaken by a pitch change bearing and pushrod system at the hub of a rotor system. Example embodiments improve on this approach by making the blades 112 twist without any mechanical systems at the rotor hub 113.

Figure 2:
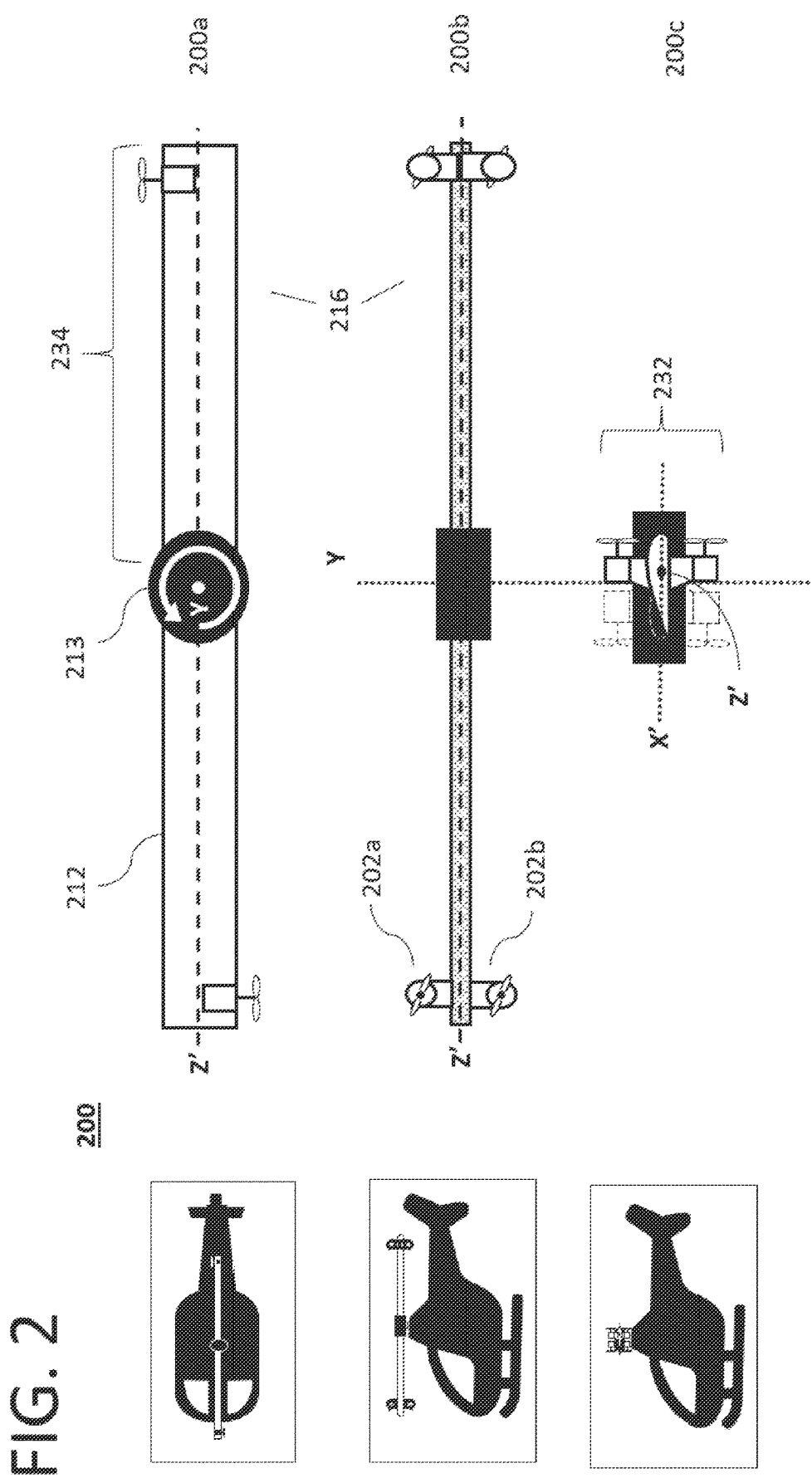
FIG. 2 is multidimensional diagram of an offset propeller driven rotor according to an example embodiment.

FIG. 2 is multidimensional diagram 200 of an offset propeller driven rotor according to an example embodiment. Multidimensional diagram 200 provides three views: an upper surface view 202a, a spanwise view 202b, and a chordwise axis view 200c. The various views of the multidimensional diagram 200 depict a rotor hub 213 in the center of a rotor system 216, the Y-axis serving as the rotor shaft axis. Protruding from the rotor hub 213 are two blades 212. The blade twist axis Z' extends along the centerline of the rotor system 216. The blades 212 may be long and slender wings.

The upper surface view 200a depicts an offset propeller unit configuration 234 along the upper surface of blade 212, with the blade twist axis Z' traversing the two blades 212. From this angle, the tip of each blade 212 includes a single upper surface offset propeller unit 202a, with the lower surface offset propeller unit 202b hidden from view.

The spanwise view 200b depicts both the upper surface offset propeller units 202a and the lower surface offset propeller units 202b. The chordwise axis view 200c illustrates the chordwise axis X' traversing a leading edge and trailing edge of a blade 212. The chordwise view 200c also depicts an offset propeller unit configuration 232 of a single blade along the chordwise axis X'.

This configuration of an offset propeller driven rotor, as well as others depicted in example embodiments, eliminates the need for a conventional swashplate and blade pitch control hardware to control the blade pitch angle. Furthermore, if used to drive the rotor rotation, the example embodiments further eliminate the need for an engine, transmission, drive system and anti-torque system (e.g., tail rotor) of a conventional rotorcraft (e.g., helicopter).

Example embodiments may also include controllers in order to instruct the offset propeller units 202a, 202b at each tip of the blades 212 in order to facilitate precision performance. The pitch of blades 212 may be precision controlled in such as manner as to provide individual blade control, high harmonic blade control, and optimized aerodynamic performance of the rotor when multiple propellers are utilized both in the cross section and/or along the span of the blades 212. Furthermore, the offset propeller driven rotor could be employed on slowed-rotor or stopped-rotor configurations.

Figure 3:
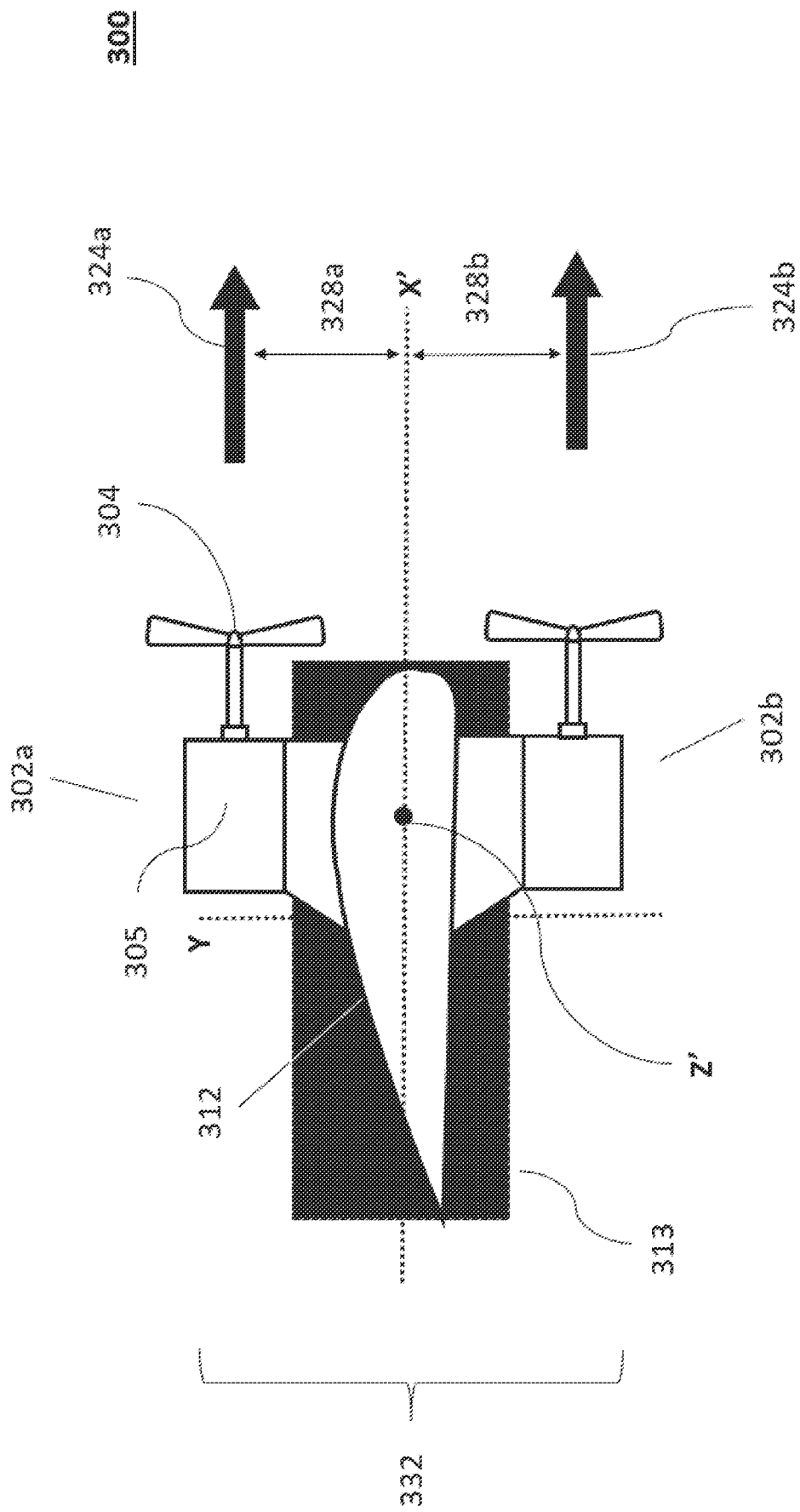
FIG. 3 is a chordwise view of an offset propeller driven rotor according to an example embodiment.

FIG. 3 is a chordwise view 300 of an offset propeller driven rotor according to an example embodiment. Chordwise view 300 depicts an offset propeller unit configuration 332 of a single blade along the chordwise axis X'. In this configuration, there is an upper surface offset propeller unit 302a and a lower surface offset propeller unit 302b. Both offset propeller units 302a, 302b are located at, or near, a leading edge of a blade 312. Each offset propeller unit 302a, 302b includes a propeller 304 and a motor 305. The motor 305 may be an electric motor.

Chordwise view 300 depicts an airfoil cross-section of the blade 312. During operation, the propellers move air from the leading edge of the blade 312 to the trailing edge. Each offset propeller unit 302a, 302b generates offset propeller thrust 324a and 324b, respectively. For context, the background illustrates rotor hub 313—about which the blade 312 rotates.

Notably, the thrust generated by the offset propeller units 302a, 302b is offset relative to the chordwise axis X'. Therefore, there is an upper surface propeller offset distance 328a and a lower surface propeller offset distance 328b. In this configuration, the propeller offset distances 328a, 328b are the same. In alternative embodiments, the propeller offset distances 328a, 328b may be different, or any individual one may be zero.

Each of the propellers 304 produce thrust that is independently controlled. More specifically, each of the offset propeller units 302a, 302b may be independently controlled to produce upper surface offset propeller thrust 324a and lower surface offset propeller thrust 324b independent of one another.

The blade twist axis Z' of the blade 312 is the axis through which blade pitch angle changes occur. Through variations in propeller thrust 324a, 324b, combined with the propeller offset distances 328a, 328b, a net force and a net moment about the blade twist axis Z' may be created. The net force and moment may be independently controlled through precise control of the thrust (and/or power) settings of each motor 305 and/or propeller 304. The net force and moment may be further controlled by the dimensions and material of the blade 312. For example, the longer and slender the blade 312, the less power may be needed by the offset propeller units 302a, 302b to generate the requisite pitch. As such, there is an inverse relationship between the offset distances 328a, 328b and the offset propeller thrust 324a, 324b needed to generate the blade pitch angle, such that increasing the offset distance requires less thrust to generate the blade pitch angle.

Figure 4:
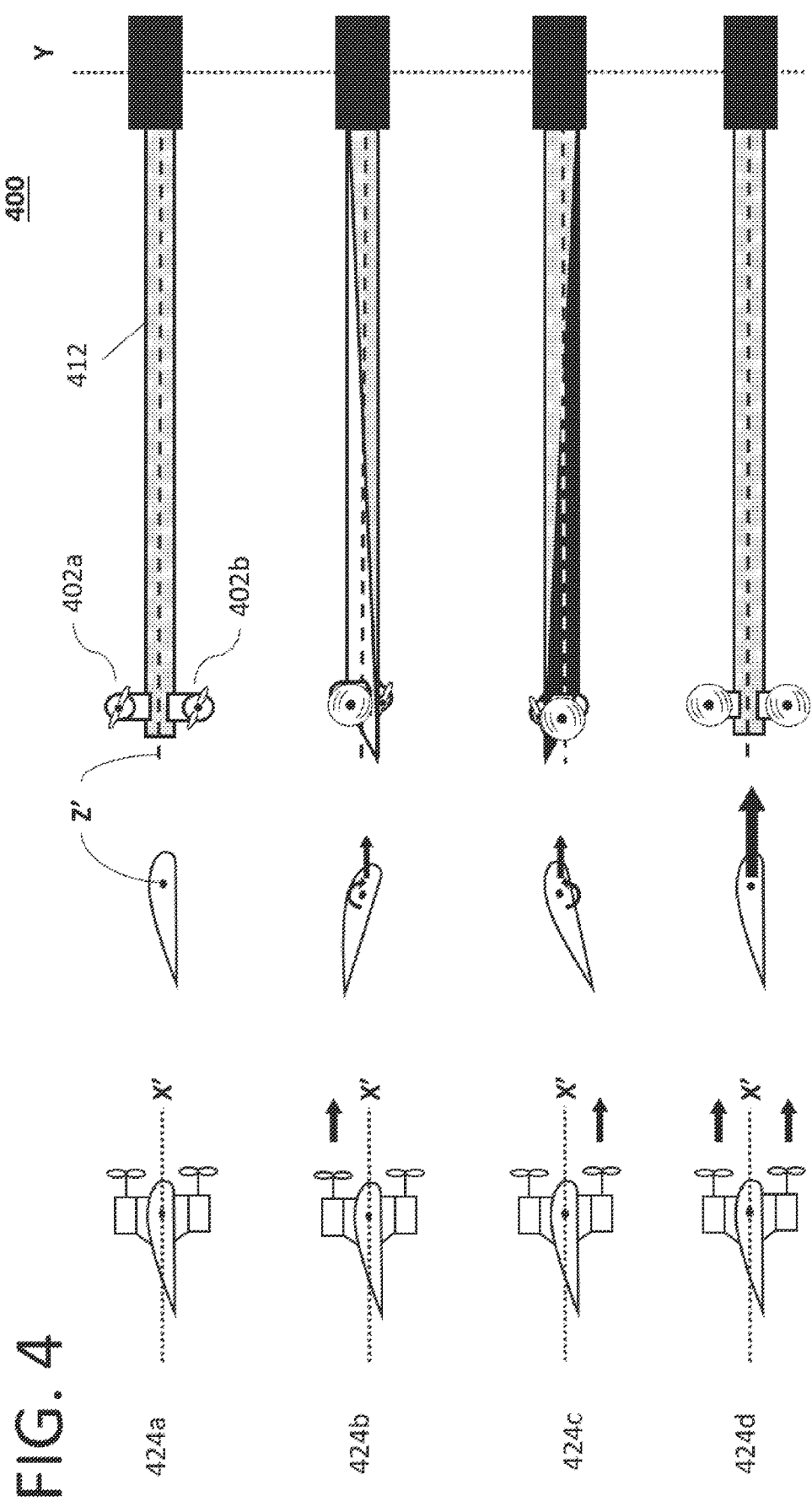
FIG. 4 is a multi-view depiction of differential propeller thrust operations, and resultant net force and moment combinations of an offset propeller driven rotor according to an example embodiment
Figure 5:
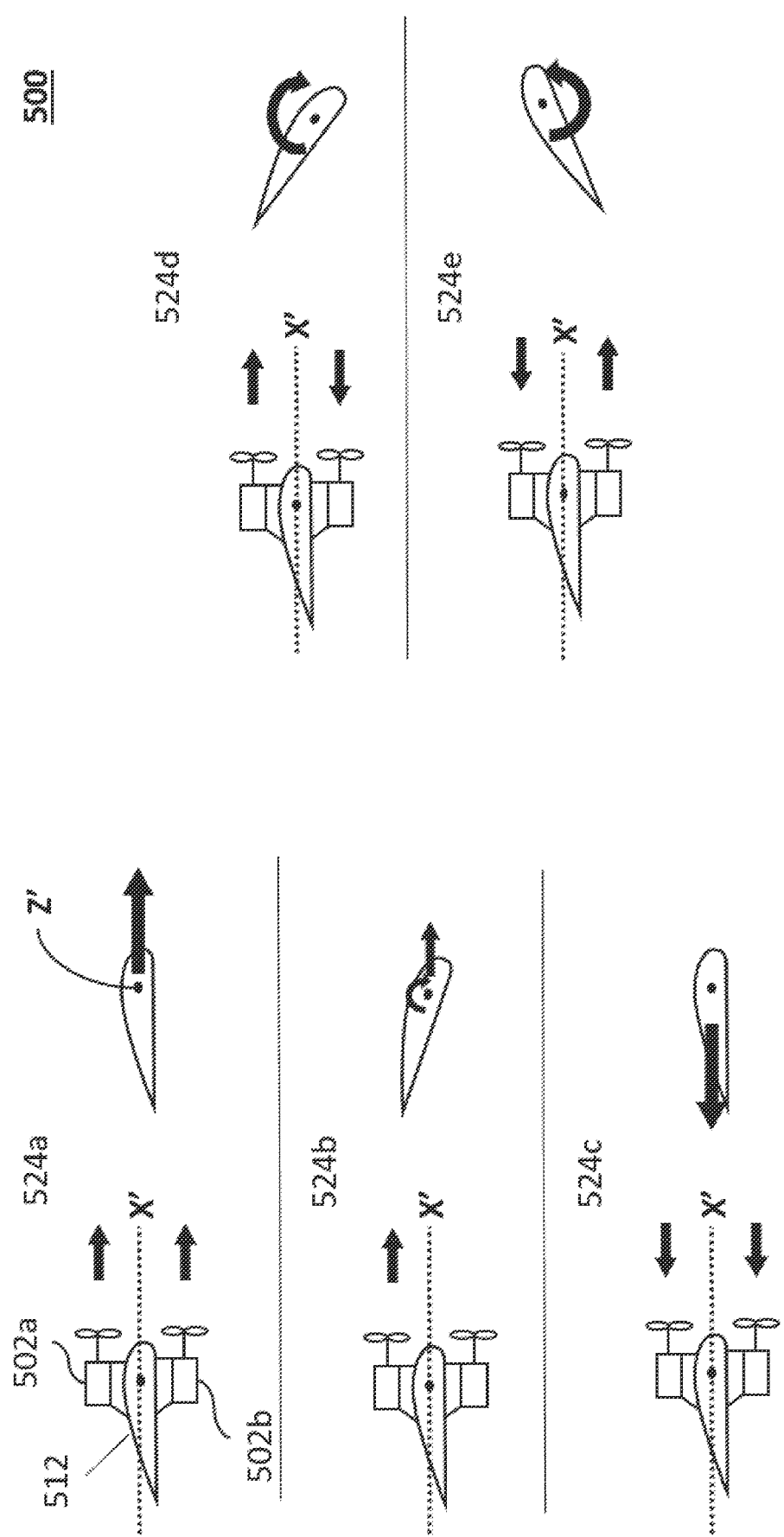
FIG. 5 is a chordwise view of a differential propeller thrust operation and resulting net force and net moment for different combinations of an offset propeller driven rotor according to an example embodiment.

FIG. 4 is a multi-view depiction of differential propeller thrust operations 400, and resultant net force and moment combinations of an offset propeller driven rotor according to an example embodiment. The net force and net moment can be independently controlled through precise control of the thrust (and/or power) settings of each offset propeller unit. This concept of independent force and moment control is illustrated in FIG. 4 and FIG. 5. FIG. 4 depicts four separate propellers thrust operations and provides three views for each. A first view is a chordwise view of an offset propeller driven rotor. A second view is an illustration of the net force and moment on a blade 412. Finally, a third view is a spanwise view across the blade 412.

In a first offset propeller thrust operation 424a, offset propeller units 402a, 402b are not active. As a result, there is no positive force and no moment on the blade 412. There is no twisting of the blade 412 along the blade twist axis Z'. The blade pitch angle is zero.

In a second offset propeller thrust operation 424b, there is a resulting positive force and negative moment. In this operation, only the upper surface offset propeller unit 402a is activated to generate offset propeller thrust above the chordwise axis X'. The positive force will drive the blade 412 to rotate along a rotor shaft connected to a hub. In addition, the resulting negative moment caused by the offset thrust may cause the tip of the blade 412 to twist about the blade twist axis Z' in a negative direction, thus creating a negative blade pitch angle. This is illustrated in spanwise view of the second offset propeller thrust operation 424b.

In a third offset propeller thrust operation 424c, the opposite operation takes place. More specifically, there is a resulting positive force and positive moment. In this operation, only the lower surface offset propeller unit 402b is activated to generate offset propeller thrust below the chordwise axis X'. Like the previous example, the positive force will cause the blade 412 to rotate along a connected hub. However, in this instance the blade is subject to a positive moment due to the offset thrust in the lower surface of the blade 412. As a result, the blade 412 may twist in the opposite direction about the blade twist axis Z', creating a positive blade pitch angle. This is illustrated in spanwise view of the third offset propeller thrust operation 424c.

In a fourth offset propeller thrust operation 424d, the offset propeller units 402a, 402b generate the same amount of offset propeller thrust. This results in a greater positive force than previously described. Since the offset propeller thrust in the upper surface and the lower surface are the same, the moment created at each side cancels each other out, resulting in no net moment. As a result, the blade 412 does not twist about the blade twist axis Z' as illustrated in spanwise view of the fourth offset propeller thrust operation 424d.

The differential propeller thrust operations 400 illustrate operations with a particular type of configuration of offset propeller units. This same operation may or may not be replicated at an opposite or adjacent blade 412 connected to the same hub. Through precision control of each of the offset propeller units 402a, 402b, both collective pitch and cyclic pitch may be achieved without the need of heavy machinery. More specifically, the offset propeller units 402a, 402b for an entire rotor system may be "collectively" controlled such that all the blades may have the same pitch angle as they rotate about a shaft. In addition, the offset propeller units 402a, 402b may be "cyclically" controlled such that blade pitch angle for all the blades varies in cycles as the blades rotate about a shaft. Alternative embodiments can achieve similar operations with different configurations.

FIG. 5 is a chordwise view of a differential propeller thrust operation 500 and resulting net force and net moment for different combinations of an offset propeller driven rotor according to an example embodiment. FIG. 5 expands on the operations illustrated in FIG. 4. FIG. 5 shows different thrust settings (positive, negative, or zero) for an upper surface offset propeller unit 502a and a lower surface offset propeller unit 502b. The thrust setting is illustrated by at least one offset propeller thrust arrow, pointing in the direction of the thrust. Adjacent to each thrust depiction is an illustration of the resulting net force and net moment applied to the blade 512 at the tip.

A first offset propeller thrust operation 524a provides both offset propeller units 502a, 502b providing equal offset thrust in the same direction. This results in positive force and no moment. A second offset propeller thrust operation 524b provides offset propeller thrust from only the upper surface offset propeller unit 502a. This results in both positive force and negative moment. The negative moment causes a blade pitch angle on blade 512 and the positive force drives the rotor about a shaft.

A third offset propeller thrust operation 524c results negative force only. This is realized by having both offset propeller units 502a, 502b providing equal offset thrust in the same, negative, direction resulting in an offset propeller thrust that is opposite to the first offset propeller thrust operation 524a. In other words, the negative force acts to slow the rotor system rotation.

The offset propeller units 502a, 502b may be operated to cause in large blade pitch angles. For example, a fourth offset propeller thrust operation 524d has the upper surface offset propeller unit 502a providing thrust in a positive direction, while the lower surface offset propeller unit 502b provides an equivalent amount of thrust in a negative direction. This provides a greater negative moment than that described in the second offset propeller thrust operation 524b. The fourth offset propeller thrust operation 524d thus results in an increased negative pitch on the blade 512, while at the same time providing no additional net force.

A fifth offset propeller thrust operation 524e reverses the operation of the offset propeller units 502a, 502b described in the fourth offset propeller thrust operation 524d. More specifically, in the fifth offset propeller thrust operation 524e the upper surface offset propeller unit 502a providing thrust in a negative direction, while the lower surface offset propeller unit 502b provides an equivalent amount of thrust in a positive direction. This results in an increased positive pitch on the blade 512, while at the same time providing no additional net force. Such operations may facilitate speeding up, slowing down, and/or or even stopping a rotor system.

FIG. 6 is a chordwise view of alternative offset configurations 600 of an offset propeller driven rotor according to example embodiments. This figure illustrates alternative configurations of offset propeller units to achieve redundancy, greater net force, and greater moment along a blade twist axis. Through changes in propeller rotation speed and direction, the thrust from each offset propeller unit can be positive or negative. Propellers can be located near the leading edge or trailing edge of a blade.

Configuration 632a shows a single offset propeller unit at an upper surface and in the leading edge. Configuration 632b shows the configuration referenced in previous example embodiments: an upper surface offset propeller unit paired with a counterpart lower surface offset propeller unit, both at the leading edge. Configuration 632c shows an upper surface offset propeller unit at the leading edge, but a counterpart lower surface offset propeller unit at the trailing edge. Configuration 632d shows both the upper surface offset propeller unit and the lower surface offset propeller unit at the trailing edge. Configuration 632e has one pair of offset propeller units at the leading edge, and another pair at the trailing edge.

Notably, the offset propeller units may be paired with an additional propeller unit that has zero offset. Zero-offset propeller units mainly contribute to the net force while not impacting moment about the blade twist axis Z'. For example, configuration 632f shows a single offset propeller unit at the upper surface and in the leading edge, paired with a zero-offset propeller unit at the leading edge. Configuration 632g shows an upper surface offset propeller unit and a lower surface offset propeller unit, both at the leading edge, combined with a zero-offset propeller unit at the trailing edge. Finally, configuration 632h shows an upper surface offset propeller unit, a lower surface offset propeller unit, and a zero-offset propeller unit all at the leading edge.

Figure 7:
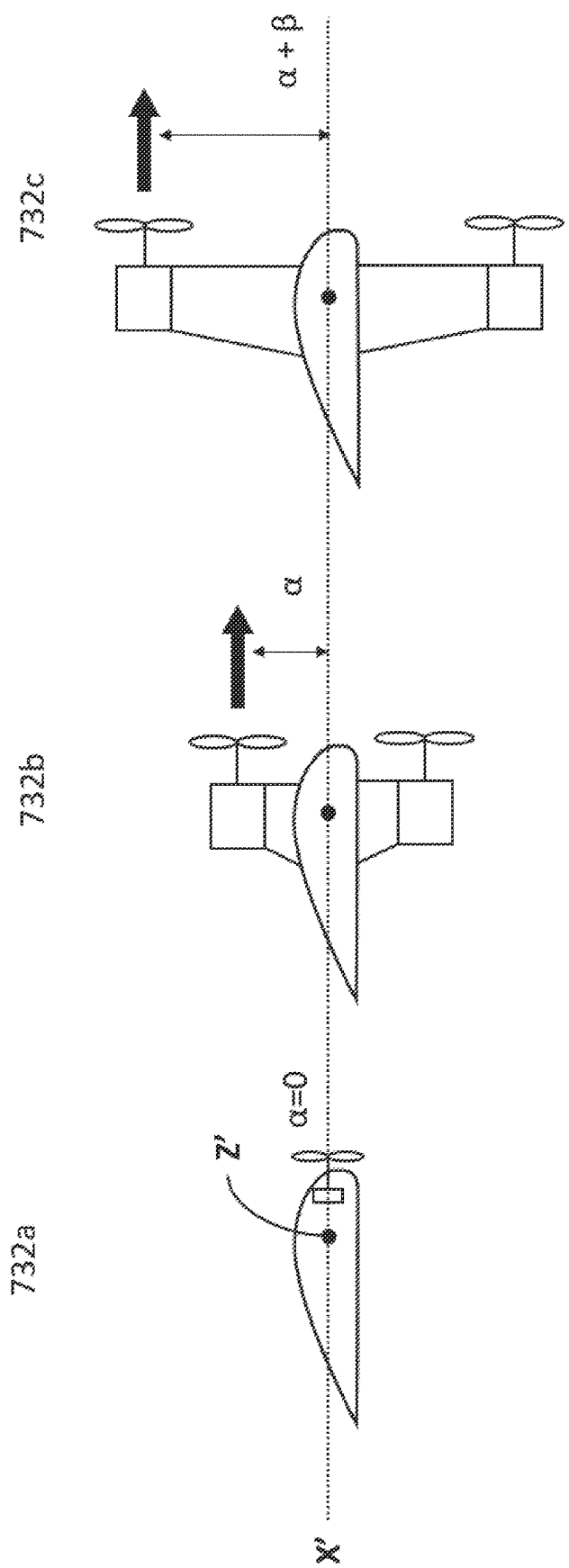
FIG. 7 is a chordwise view of alternative offset configurations at varying amounts of propeller offset of an offset propeller driven rotor according to example embodiments.

FIG. 7 is a chordwise view of alternative offset configurations 700 at varying amounts of propeller offset of an offset propeller driven rotor according to example embodiments. Propellers may be located at various locations above and below a blade cross section (the chordwise axis X') to increase or decrease offset distance. As previously stated, length of the offset may contribute to blade pitch along the blade twist axis Z'. Offset distance in FIG. 7 is depicted as a. The greater the offset distance a, the greater the moment that can be created along the blade twist axis Z', assuming equal thrust by an offset propeller unit.

For example, configuration 732a has a zero-offset propeller unit. As such, in this example, a equals zero. Configuration 732b includes offset propeller units with an offset of a. In a more extreme example embodiment, configuration 732c provides offset propeller units with an offset of a+ß, where ß is an additional offset distance. This latter configuration would provide the most blade pitch, but it may also impact weight and aerodynamics at a blade tip.

Figure 8:
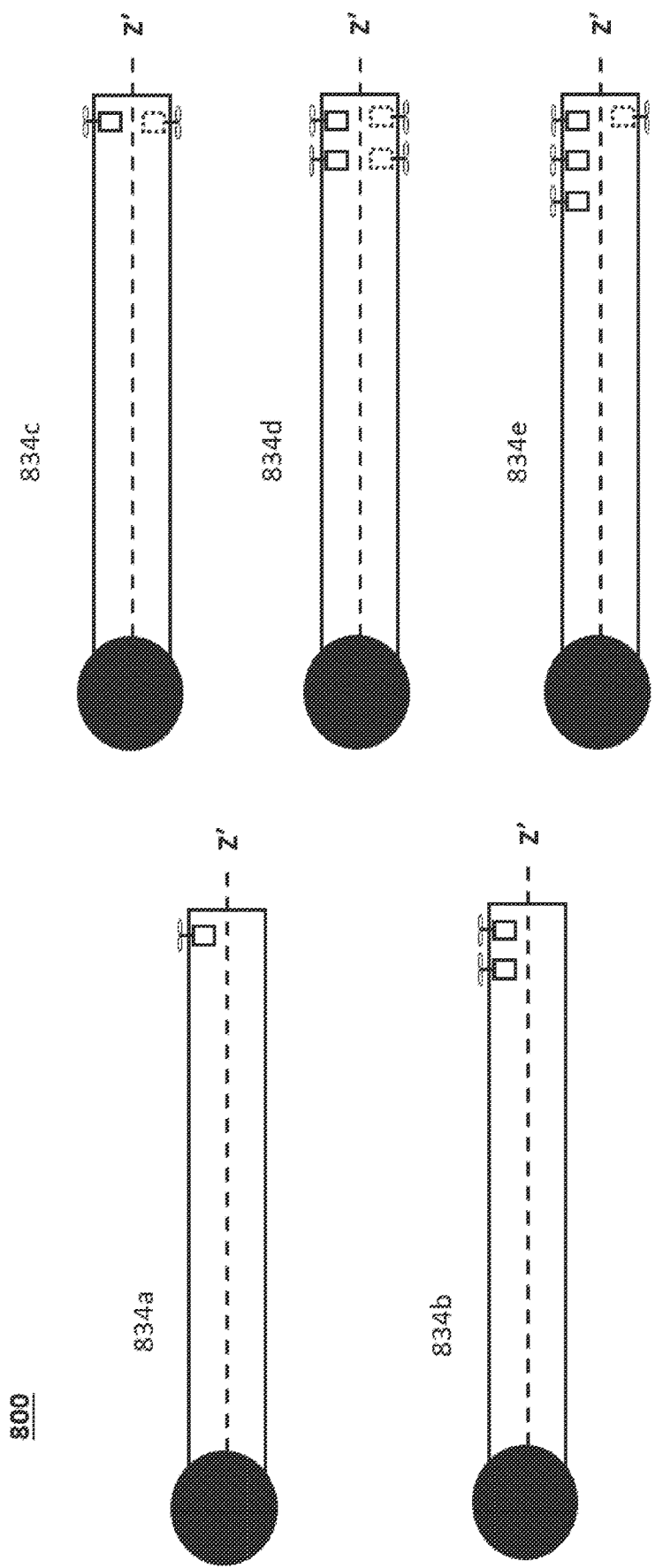
FIG. 8 is an upper surface view of alternative blade configurations of an offset propeller driven rotor according to an example embodiment.

FIG. 8 is an upper surface view of alternative blade configurations 800 of an offset propeller driven rotor according to an example embodiment. This view highlights various alternative configurations for placement of offset propeller units along the span of a blade. Optimization of rotor aerodynamic performance and control may be achieved with precise sizing, control and placement of multiple redundant offset propellers, as illustrated in the alternative configurations 800. In addition to applications for aircraft rotorcraft, it is envisioned that there could be similar applications of this invention to control concepts for surface water and underwater vehicles.

Configuration 834a has a single upper surface offset propeller unit along the leading edge. In comparison, configuration 834b has two upper surface offset propeller units along the leading edge.

Subsequent configurations highlight example embodiments with at least one upper surface offset propeller unit at the leading edge, and at least one lower surface offset propeller unit at the trailing edge. The lower surface offset propeller units are depicted with dashed lines since FIG. 8 illustrates an upper surface view of the blade. More specifically, configuration 834c has a single upper surface offset propeller unit along the leading edge, and a single lower surface offset propeller unit at the trailing edge. Configuration 834d has two upper surface offset propeller unit along the leading edge, and two lower surface offset propeller unit at the trailing edge. Finally, configuration 834e has three upper surface offset propeller unit along the leading edge, and one lower surface offset propeller unit at the trailing edge. The configurations in these example embodiments have the offset propeller units concentrated on the blade tips. Alternative example embodiments may place the offset propeller units in other parts of the blade.

FIG. 9 depicts alternative offset propeller units 900 of an offset propeller driven rotor according to an example embodiment. The motors driving the offset propeller units could be electric motors connected by wires through a slip ring in a rotor system hub to a central power supply in the aircraft (e.g., battery or generator). Offset propeller unit 902a uses an open propeller. Offset propeller unit 902b uses a ducted propeller. Finally, offset propeller unit uses a turbine blade mechanism. These example embodiments are not exhaustive and may encompass other propeller technologies.

The example embodiments being thus described, it will be obvious that the same may be varied in many ways. Such variations are not to be regarded as a departure from the disclosed subject matter, and all such modifications are intended to be included within the scope of the disclosed subject matter.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Any combinations of these items can be present. In some examples, "at least one of" can be, for example, without limitation, two of item A; one of item B; and ten of item C; four of item B and seven of item C; or other suitable combinations.

What is claimed is:

1. A propeller apparatus comprising:
   at least one blade, configured to be able to twist along a blade twist axis spanning a length of the blade;
   a hub configured to connect the at least one blade to a central point;
   a shaft connected to the hub and configured to rotate such that the at least one blade rotates about a shaft axis defined by a location of the shaft; and
   at least one offset propeller unit located in at least one of an upper surface and a lower surface of the at least one blade, the at least one offset propeller unit configured to provide thrust;
   wherein
      the thrust of the at least one offset propeller unit generates a force to cause the at least one blade to rotate about the shaft axis, and
      the thrust of the at least one offset propeller unit generates a moment about the blade twist axis of the at least one blade, causing the blade to twist and have a blade pitch angle.

2. The propeller apparatus of claim 1, wherein rotating the at least one blade with the blade pitch angle generates lift for a rotorcraft.

3. The propeller apparatus of claim 1, wherein each of the at least one offset propeller unit comprises:
   a propeller configured to generate a corresponding thrust;
   a motor connected to the propeller and configured to turn the propeller;
   wherein the propeller has an offset distance relative to a chordwise axis of a corresponding blade, such that the offset distance allows the corresponding blade to twist about the blade twist axis and generate the blade pitch angle.

4. The propeller apparatus of claim 3, wherein there is an inverse relationship between the offset distance and the thrust needed to generate the blade pitch angle, such that increasing the offset distance requires less thrust to generate the blade pitch angle.

5. The propeller apparatus of claim 1, wherein the at least one offset propeller unit comprises:
   at least one upper surface offset propeller unit configured to generate a upper surface offset propeller thrust; and
   at least one lower surface offset propeller unit configured to generate a lower surface offset propeller thrust;
   wherein the upper surface offset propeller thrust and the lower surface offset propeller thrust generate a net offset propeller thrust,
   wherein each of the at least one upper surface offset propeller unit and the at least one lower surface offset propeller unit is independently controlled such that variations in the upper surface offset propeller thrust and the lower surface offset propeller thrust generate different magnitudes of the net offset propeller thrust.

6. The propeller apparatus of claim 5, wherein the at least one upper surface offset propeller unit and the at least one lower surface offset propeller unit are configured such that,
   when the upper surface offset propeller thrust and the lower surface offset propeller thrust are equal and in a same positive direction, the net offset propeller thrust provides a positive force to the at least one blade;
   when the upper surface offset propeller thrust and the lower surface offset propeller thrust are equal and in a same negative direction, the net offset propeller thrust provides a negative force to the at least one blade;
   when the upper surface offset propeller thrust is in a positive direction and the lower surface offset propeller thrust is zero, the net offset propeller thrust is equal to the upper surface offset propeller thrust and provides a positive force to the at least one blade, and a first negative moment causes a first blade pitch angle on the at least one blade;
   when the upper surface offset propeller thrust is in a positive direction and the lower surface offset propeller thrust is in an equal and negative direction, the net offset propeller thrust is zero and a second negative moment causes a second blade pitch angle on the blade, such that second negative moment is a greater magnitude than the first negative moment and the second blade pitch angle is greater than the first blade pitch angle;
   when the upper surface offset propeller thrust is in a negative direction and the lower surface offset propeller thrust is in an equal and positive direction, the net offset propeller thrust is zero and the positive moment causes a third blade pitch angle on blade, such that the third blade pitch angle is opposite to the second blade pitch angle.

7. The propeller apparatus of claim 1, wherein the at least one offset propeller unit is configured to generate the blade pitch angle collectively for all the at least one blade.

8. The propeller apparatus of claim 1, wherein the at least one offset propeller unit is configured to generate the blade pitch angle in cycles as the at least one blade cycles around the shaft axis.

9. The propeller apparatus of claim 1, further comprising a zero-offset propeller unit.

10. The propeller apparatus of claim 1, wherein the at least one offset propeller unit is located at respective tips of the at least one blade.

11. An offset propeller unit comprising:
   a propeller configured to generate thrust to a blade connected to the offset propeller unit; and
   a motor connected to the propeller and configured to turn the propeller;
   wherein the thrust generates a force to cause the blade to rotate about a shaft axis, and wherein the thrust generates a moment about a blade twist axis of the blade, the blade twist axis spanning the length of the blade, such that the moment causes the blade to twist and have a blade pitch angle;

wherein the propeller has an offset distance relative to a chordwise axis of the blade, such that the offset distance allows the corresponding blade to twist about the blade twist axis.

12. The offset propeller unit of claim 11, wherein there is an inverse relationship between the offset distance and the thrust needed to generate the blade pitch angle, such that increasing the offset distance requires less thrust to generate the blade pitch angle.

13. The offset propeller unit of claim 11, wherein the offset propeller unit is connected to an upper surface of the blade.

14. The offset propeller unit of claim 11, wherein the offset propeller unit is connected to a lower surface of the blade.

\* \* \* \* \*